United States Patent [19]
Fretz, III

[11] 4,326,755
[45] Apr. 27, 1982

[54] DECELERATION CONTROL CIRCUIT

[75] Inventor: George C. Fretz, III, Cuyahoga Falls, Ohio

[73] Assignee: Goodyear Aerospace Corporation, Akron, Ohio

[21] Appl. No.: 38,046

[22] Filed: May 11, 1979

[51] Int. Cl.³ .................................................. B60T 8/08
[52] U.S. Cl. ....................................... 303/96; 244/111; 303/108
[58] Field of Search ................... 244/111; 303/108, 93, 303/96, 97, 105, 92; 188/181 R, 181 A; 361/238

[56] References Cited

U.S. PATENT DOCUMENTS 3,520,575 7/1970 Steigerwald ........................... 303/93
3,951,466 4/1976 Guagliumi et al. ......... 188/181 A X Primary Examiner—J. D. Miller
Assistant Examiner—Reinhard J. Eisenzopf
Attorney, Agent, or Firm—P. E. Milliken; E. W. Oldham; R. L. Weber

[57] ABSTRACT

A deceleration control circuit for limiting the deceleration rate and applied brake pressure at vehicle speeds below a predetermined level. The invention substantially eliminates strut vibrations in aircraft resulting from "grabby" brakes during a braking operation. The invention includes a deceleration detector, operative at vehicle speeds below a particular level, to produce an output signal to the brake valve driver to reduce brake pressure when the deceleration rate exceeds a specific level. The circuitry is adapted to operate in conjunction with an antiskid system and also includes built-in test circuitry for testing the operability of both the antiskid circuitry and the deceleration control circuitry.

14 Claims, 5 Drawing Figures

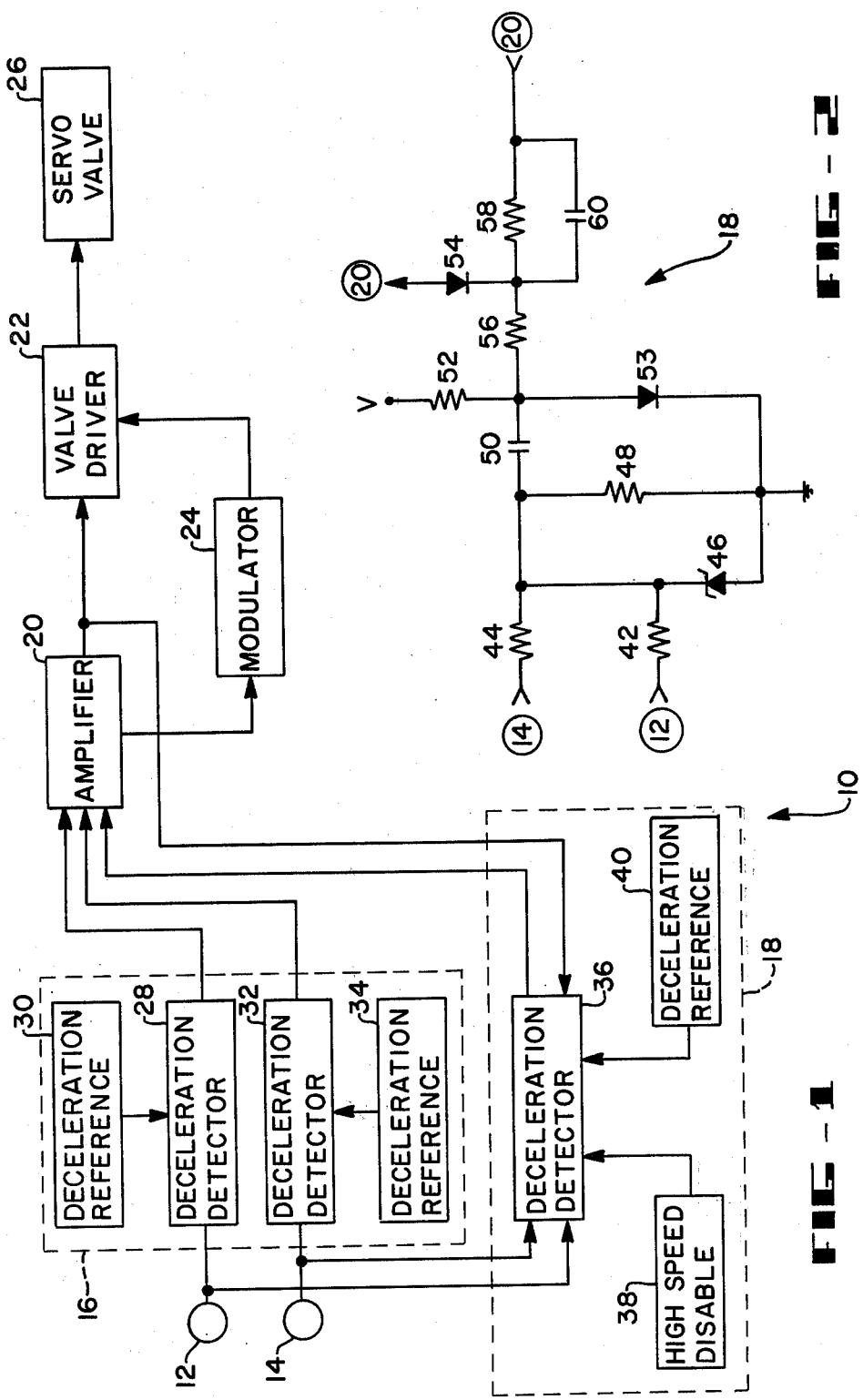

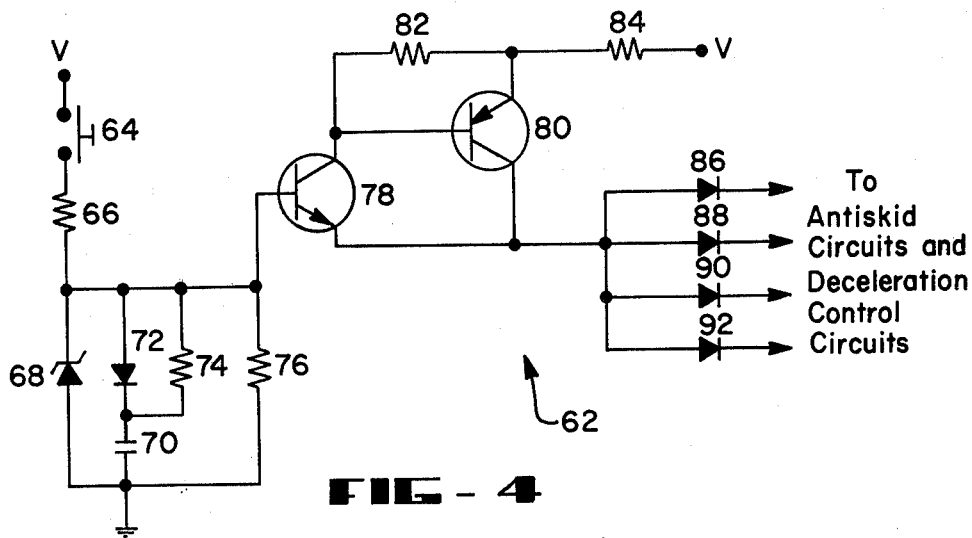
FIG-4
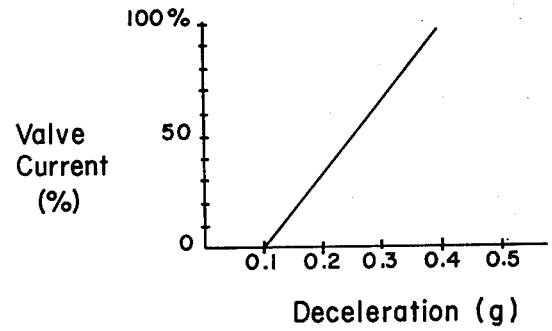
FIG-3
FIG-5

DECELERATION CONTROL CIRCUIT

BACKGROUND OF THE INVENTION

The invention herein resides in the art of brake control systems and more particularly relates to such systems for aircraft. The invention includes a circuit for controlling the rate of deceleration of an aircraft and accordingly for controlling the applied brake pressure when the aircraft speed is below a particular level. It will be understood that while the invention herein is described with respect to an aircraft, particularly one having four braked wheels, the invention is applicable to any vehicle having any number of braked wheels.

Heretofore in the aircraft industry, pilots have often experienced a "grabbiness" in brakes when the aircraft runway speed has dropped below a particular level. This grabbiness is usually a result of the brake mix or material composition of the vehicle brakes themselves. At high runway speeds, during the initial braking effort, no grabbing is experienced. This is because the brakes are, at this point in time, operating at a very high temperature. However, as the aircraft begins to slow down and the brakes begin to cool, they become tacky. This tackiness is believed to result from the fact that during initial brake application there is an actual sintering of the brake material and as the vehicle slows down and the brakes begin to cool, the sintered brake material makes the braking surfaces tacky, causing the brakes to grab. The result is passenger discomfort and control difficulties from the resultant strut vibrations.

It will be understood to those skilled in the art that the physical design and structure of the aircraft strut may tend either to amplify or dampen the vibrations resulting from brake grab. However, costly and complex strut designs are often required to alleviate the strut vibrations and, if the choice is made in favor of a lighter weight design, the physical structure of the strut may, indeed, accentuate the vibrations.

It should also be appreciated that brake grab may be reduced or substantially eliminated by appropriate selection of brake mix or composition. However, a trade off generally has to be made between brake wear and reduction in brake grab. Softer brakes, being substantially free of brake grab, generally have high wear rate and are thus costly with respect to the periods of required replacement. Of course, carbon brakes are not characteristically grabby, but are too expensive for many applications.

OBJECTS OF THE INVENTION

In light of the foregoing, it is an object of the instant invention to provide a deceleration control circuit in an aircraft braking system which allows the use of long wearing brakes without the experiencing of brake grab.

Another object of the invention is to provide a deceleration control circuit which may be used in an aircraft braking system to reduce the cost, weight, and complexity of exotic strut designs.

Still another object of the invention is to provide a deceleration control circuit for use in a braking system which allows the use of antiskid control circuitry within the braking system such that the antiskid control circuit and the deceleration control circuit are capable of operation without interference from each other.

Yet an additional object of the invention is to provide a deceleration control circuit which includes a built-in test circuit for checking the operability of both the deceleration control circuit and an associated antiskid circuit.

Another object of the invention is to provide a deceleration control circuit which allows full application of the brake pressure for parking or "engine run-up" operations.

Still another object of the invention is to provide a deceleration control circuit which is simplistic and inexpensive to construct and easily adapted for inclusion in braking systems utilizing antiskid control circuitry.

SUMMARY OF THE INVENTION

The foregoing and other objects of the invention which will become apparent as the detailed description proceeds are achieved by the improvement of a deceleration control circuit in a brake control system of a wheeled vehicle for limiting the pressure which may be applied to the brakes of the wheels, comprising: deceleration detection means receiving an input signal corresponding to instantaneous wheel speed for producing an output signal corresponding to the rate of deceleration of the wheels; enabling circuit means connected to said deceleration detection means for inhibiting operation of said deceleration detection means at vehicle speeds above a particular level; and reference circuit means connected to said deceleration detection means for inhibiting said output signal at deceleration rates below a predetermined level.

DESCRIPTION OF DRAWINGS

For a complete understanding of the objects, techniques, and structure of the invention, reference should be had to the following detailed description and accompanying drawings wherein:

FIG. 1 is a block diagram of the deceleration control circuitry of the invention showing the same interconnected with an antiskid system for an aircraft;

FIG. 2 is a schematic diagram of the deceleration control circuit of the invention;

FIG. 3 is a graph showing the relationship between vehicle deceleration and valve current in a braking system utilizing the deceleration control circuit of the invention;

FIG. 4 is a schematic diagram of the test circuit of the invention adapted for testing operability of both the antiskid circuitry and the deceleration control circuitry; and FIG. 5 is a series of graphs showing the operation of the test circuitry of FIG. 4.

DETAILED DESCRIPTION OF PREFERRED EMBODIMENT

Referring now to the drawings and more particularly FIG. 1, it can be seen that brake control circuitry of the invention is designated generally by the numeral 10. The circuit includes wheel speed transducers 12, 14 for producing output signals of a varying DC level corresponding to the instantaneous rotation speed of an associated wheel. This structure is well known to those skilled in the art and is not elaborated upon herein. It will be appreciated that the circuit of FIG. 1 is adapted for use on an aircraft having four braked wheels, with the specific circuitry 10 servicing two such wheels on the same strut. Of course, identical circuitry would be provided for the other two wheels on the remaining strut and the invention can, of course, be expanded to any braked wheel configuration.

The DC output signals from the transducer circuitry 12, 14 is applied to an antiskid control circuitry 16 and deceleration control circuitry 18. The outputs from the circuits 16, 18 are indicative of braking operations and are applied to an amplifier 20 which feeds a valve driver 22 to control the brake servovalve 26, each of the two wheels being controlled by this common valve. There is also included a modulator 24, fed by the amplifier 20, which is adapted to modulate or regulate the reapplication of brake pressure via the elements 22, 26 after a skid has been experienced and brake pressure accordingly released. Again, this type of structure and operation is readily conceivable to those skilled in the art.

The antiskid circuit 16 includes a deceleration detector 28 and a deceleration reference circuit 30 associated with the wheel of the transducer 12 and similar circuitry 32, 34 operating with the wheel of the transducer 14. Suffice it to say that the deceleration detectors 28, 32 receive the DC velocity signals from the elements 12, 14 and, by differentiating the same, establish deceleration signals. These signals are compared against deceleration reference signals from the circuits 30, 34 and, if the deceleration rate is indicative of a skid or other undesired braking condition, appropriate output signals are passed to the amplifier 20. Amplification of those signals and release of brake pressure via the elements 22-26 may then be controlled in the standard fashion. It should, of course, be appreciated that the servovalve 26 is of the type that releases pressure upon receipt of a signal such that brake pressure is inversely related to the input current signal.

With continued reference to FIG. 1, the deceleration control circuit 18 can be seen to include a deceleration detector 36. This circuit receives and differentiates the output signals from the transducers 12, 14 to generate a deceleration signal. The purpose of the deceleration control circuit 18 is to limit the rate of deceleration or application of brake pressure at vehicle speeds below a certain threshold while allowing a certain rate of deceleration below that threshold without such regulation. To this end, the high speed disable circuit 38 is provided to inhibit operation of the deceleration detector 36 at vehicle speeds above a predetermined level. Similarly, a deceleration reference circuit 40 is provided to inhibit the output of the deceleration detector 36 from controlling the servovalve 26 when the deceleration rate is below a particular level.

With reference now to FIG. 2, an appreciation of the detailed circuitry of the deceleration control circuit 18 may be had. The transducers 12, 14 supply their DC input signals via input resistors 42, 44 to a common point. The inputs to this point are scaled by the relative values of resistors 42, 44, 48. Accordingly, the control circuit 18 sees a single input signal which is substantially indicative of vehicle speed. The summed signals are clamped by a zener diode 46 which has a characteristic break-down voltage corresponding to the vehicle speed above which the deceleration detector 36 is to be inoperative. Accordingly, the elements 42-48 operate as the high speed disable circuit 38 discussed with respect to FIG. 1.

When the vehicle speed drops below the predetermined level, the zener diode 46 ceases to conduct and the vehicle speed signal is applied to the deceleration capacitor 50.

The deceleration capacitor 50 is provided with a deceleration threshold level via the constant current source established by the resistor 52 and diode 53. As long as the vehicle deceleration, evidenced by the rate of change of the signal at the input to capacitor 50, does not exceed the threshold established by this constant current source, there is no output from the circuit 18. However, when the input signal to the capacitor 50 changes sufficiently to overcome this reference deceleration level, current must then be drawn from the input of the amplifier 20, through the diode 54 and resistor 56. This current drain from the input of the amplifier 20 affectuates an output therefrom to control the valve driver 22 and servovalve 26.

Gain for the amplifier 20, as it is affected by the deceleration control circuit 18, is provided by means of the feedback resistor 58. A capacitor 60 is also provided in the feedback circuit of the amplifier 20 to operate as a low pass filter to filter out signals from the amplifier 20 resulting from skids or other large wheel speed variations as created by the antiskid circuitry 16. It is desired that the circuit 18 respond primarily to the overall vehicle deceleration and, accordingly, transient signals of the type resulting from a skidding activity are filtered. It will also be appreciated that the input resistors 42, 44, connected in common, act as a filter since the signal effecting the deceleration capacitor 50 is a summation or average of the two wheel speed input signals. Since it is rare for both wheels on a strut to skid together, the input signal to the deceleration capacitor 50 appears to be more truly a vehicle speed signal of the type desired for operation of the circuit 18.

In FIG. 3, there is shown a graph which illustrates the relationship between vehicle deceleration, in terms of gravity (g), and valve current to the valve 26. It will be seen that a dead band exists up to 0.1 g and, beyond that point, there is a linear relationship between the deceleration and valve current. Accordingly, as the deceleration rate increases, indicating that the pilot is applying increasing brake pressure, the circuit 18 seeks to release that brake pressure by an increased output signal resulting in increased valve current. In other words, as the deceleration rate increases, the amount of brake pressure available to the pilot decreases so that brake force may be reduced and gear vibration alleviated.

It should also be noted with respect to the invention that when the aircraft is not moving, the pilot has available the entire amount of brake pressure that the braking system is capable of supplying. Since the deceleration is, at this time, zero, the system is in its dead band and, accordingly, the pilot may lock the brakes for engine run-up or the like.

Included as a portion of the invention is a test circuit 62, the preferred embodiment of which is shown in FIG. 4. A test switch or button 64 is provided for applying the voltage V to an input resistor 66. A zener diode 68 is interconnected between the input resistor 66 and ground to fix the voltage level applied to the circuit 62. Upon actuation of the switch 64, the capacitor 70 is charged through the diode 72 to the zener level. Upon release of the switch 64, a discharge path for the capacitor 70 is provided via the resistors 74, 76. Power drive circuitry comprising transistors 78, 80, and resistors 82, 84, is controlled by the voltage applied via the test switch 64 and the discharging of the capacitor 70. This power drive circuit 78-84 is connected to a plurality of isolation diodes 86-92 to drive the four sets of deceleration detectors of the antiskid circuitry and deceleration control circuitry of the four braked wheel aircraft under consideration. It will be understood that the diodes 86-92 are, for example, connected to the lines interconnecting the transducers 12, 14 and their associated deceleration detectors.

With reference to FIG. 5, an understanding of the operation of the test circuitry of FIG. 4 may be seen. It will be understood that the test circuitry contemplates the utilization of an indicator such as a lamp which is connected to and driven by a pressure sensor connected to the associated serovalve 26. The indicator is such that it is illuminated when pressure is above a particular level, and is otherwise not energized. In the system under consideration, there would be two servovalves, one for the two wheels of each strut, and there could accordingly be two lamps. Of course, one skilled in the art could interconnect the pressure sensors of the two servo valves in a logic AND effect, such that a single lamp could be operative for indicating the operability of the entire system. In any event, the relationships of brake pedal position, test switch actuation, test wheel speed, valve current, brake pressure, and cockpit light energization are shown in FIG. 5.

The test is conducted with brake pressure applied as shown in the top graph of FIG. 5. With brake pressure applied, the test switch 64 is actuated momentarily to produce the square wave impulse shown in the second graph. Upon actuation of the switch 64, the drive circuitry 78-84 passes signals through the isolation diodes 86-92 indicative of a particular wheel speed. However, when the button 64 is released, the voltage level at the base of the transistor 78 makes an instanteous drop as shown at A in FIG. 5. This instanteous drop gives way to an exponential decay of test wheel speed, as shown at B, resulting from the discharge of capacitor 70 through resistors 74, 76.

The rapid change in test wheel speed at A, developed by the voltage divider resistors 74, 76, activates the antiskid circuit, which produces a spike increase in valve current, a resultant decrease in brake pressure, and the cockpit light turning off, all of which is shown in line with A in FIG. 5. With the brake pedal still depressed, valve current again decreases and brake pressure increases to a point where the cockpit lamp is again illuminated. At this point in time, the test of the antiskid circuitry has been completed.

The test wheel speed continues to decrease as per the exponential decay at B. The time constant of the capacitor 70 and resistors 74, 76 is selected such that the rate of discharge of the capacitor 70 results in a rate of change of wheel speed which exceeds the deceleration reference 40 when the speed is below that established by the high speed disable circuitry 38. Accordingly, the deceleration control circuit 18 becomes operative to increase valve current as at C, and decrease brake pressure at D. When the brake pressure has again dropped below a particular threshold level, the pressure sensor extinguishes the cockpit test light and the same is held off until the exponential decay of the test wheel speed along B becomes indicative of a deceleration rate less than that set by the reference 40. At this point in time, valve current begins to decrease as at E, brake pressure increases as at F, and the lamp again comes on. This completes the operational check of the deceleration control circuit 18, and, upon final release of brake pressure at the pedal, the cockpit test lamp is finally extinguished.

It should now be appreciated that the circuitry of FIG. 4 functions to test the operability of both the antiskid circuit and the deceleration control circuit, and allows the pilot to sense the test result via a cockpit lamp or lamps. The test is a simple one and may be performed in a short period of time, less than five seconds.

Thus it can be seen that the objects of the invention have been achieved by the structure presented hereinabove. While in accordance with the patent statutes only the best mode and preferred embodiment of the invention has been presented and described in detail, it is to be understood that the invention is not limited thereto or thereby. Consequently, for a true appreciation of the scope and breadth of the invention, reference should be had to the accompanying claims.

What is claimed is:

1. The improvement of a deceleration control circuit in a brake control system of a wheeled vehicle for limiting the pressure which may be applied to the brakes of the wheels, comprising:

deceleration detection means receiving an input signal corresponding to instantaneous wheel speed for producing an output signal corresponding to the rate of deceleration of the wheels;

disabling circuit means connected to said deceleration detection means for inhibiting operation of said deceleration detection means at vehicle speeds above a particular level; and reference circuit means connected to said deceleration detection means for inhibiting said output signal at deceleration rates below a predetermined level.

2. The improvement according to claim 1 which further includes valve control means connected to said deceleration detection means for receiving said output signal and accordingly releasing brake pressure.

3. The improvement according to claim 1 wherein said deceleration detection means comprises a capacitor and said disabling circuit means comprises a zener diode connected to said capacitor, said input signal being applied to said capacitor and zener diode.

4. The improvement according to claim 3 wherein said reference circuit means comprises a current source connected to said capacitor and supplying current thereto indicative of a predetermined deceleration threshold level.

5. The improvement according to claim 4 wherein said valve control means includes an amplifier connected to said capacitor and said current source.

6. A deceleration control circuit for use in a wheeled vehicle having braked wheels for limiting the brake pressure applied to the wheels, comprising:

a deceleration detector operatively connected to at least one wheel, receiving an input signal from the wheel and producing an output signal indicative of vehicle deceleration;

brake valve control means connected to said deceleration detector, receiving said output signal, and proportionately releasing brake pressure;

a disabling circuit connected to said deceleration detector and blocking said output signal from said deceleration detector at vehicle speeds above a particular level; and circuit means connected to said deceleration detection means for inhibiting said output signal at deceleration rates below a predetermined level.

7. The deceleration control circuit according to claim 6 which further includes a test circuit connected to said deceleration detector.

8. The deceleration control circuit according to claim 7 wherein said test circuit includes a capacitor connected to a switch, said switch being operative to control charging and discharging of said capacitor.

9. The deceleration control circuit according to claim 8 wherein said deceleration control circuit is interconnected with an antiskid circuit, said capacitor supplying an input signal to said antiskid circuit and said deceleration detector.

10. The deceleration control circuit according to claim 6 wherein said deceleration detector comprises a capacitor.

11. The deceleration control circuit according to claim 10 wherein said disabling circuit comprises a zener diode connected to said capacitor and receiving said input signal.

12. The deceleration control circuit according to claim 10 wherein said circuit means comprises current source connected to said capacitor.

13. The deceleration control circuit according to claim 12 wherein said brake valve control means comprises an amplifier connected to said capacitor and said current source, said amplifier supplying current to said capacitor when the deceleration rate exceeds said predetermined level.

14. The deceleration control circuit according to claim 13 wherein said amplifier includes a low pass filter comprising a feedback capacitor.

* * * * *